Oct. 23, 1923.
C. L. GINTY
1,471,726
CHANGE SPEED CONE PULLEY
Filed July 24, 1922
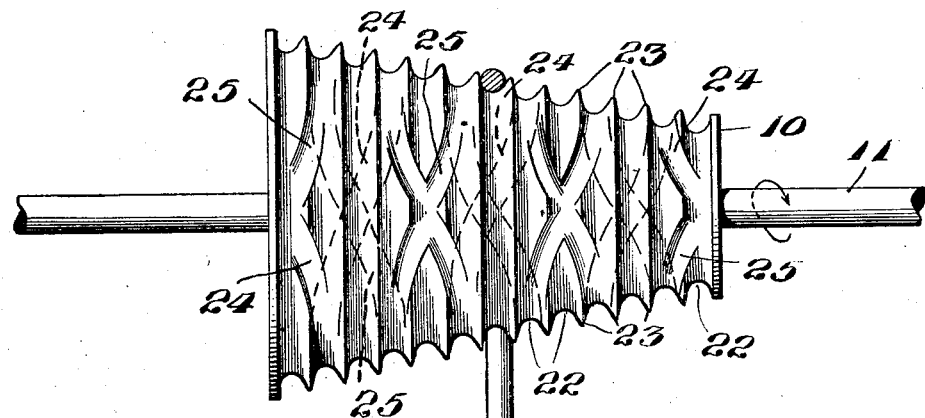
Fig. 1.
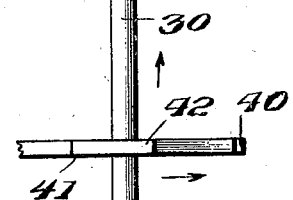
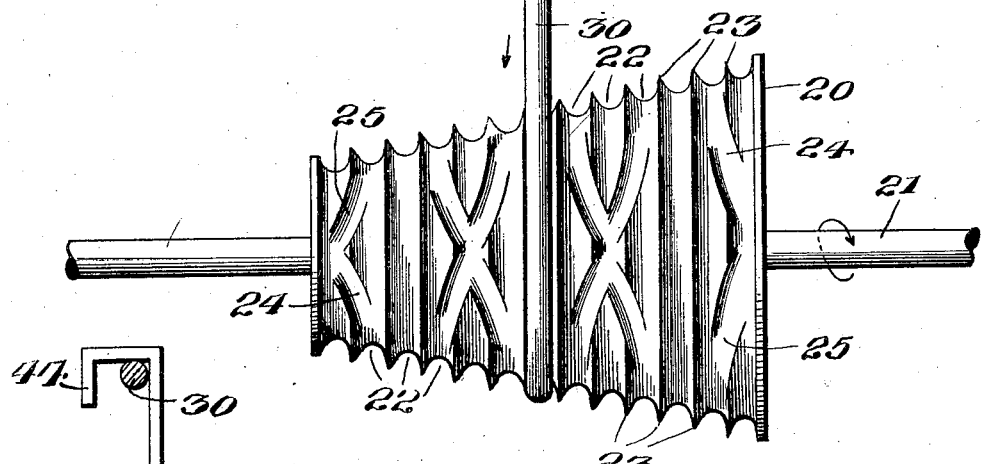
Fig. 2.
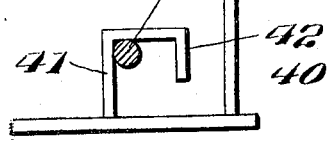
Inventor
Charles L. Ginty,
By
Hubert Peck
Attorney Patented Oct. 23, 1923.

1,471,726

UNITED STATES PATENT OFFICE.

CHARLES L. GINTY, OF LOCKPORT, NEW YORK.

CHANGE-SPEED CONE PULLEY.

Application filed July 24, 1922. Serial No. 577,117.

*To all whom it may concern:*

Be it known that I, CHARLES L. GINTY, a citizen of the United States of America, and resident of Lockport, county of Niagara, State of New York, have invented certain new and useful Improvements in and Relating to Change-Speed Cone Pulleys, of which the following is a specification.

This invention relates to certain improvements in change-speed cone pulleys, and the nature and objects of the invention will be readily recognized and understood by those skilled in the arts involved in the light of the following explanation and detailed description of the accompanying drawings illustrating what I at present consider to be the preferred embodiments or mechanical expressions of the invention from among various other forms, arrangements, combinations and constructions of which the invention is capable within the spirit and scope thereof.

The instant invention is directed to change speed gearing of the general type characterized in its simplest form by a pair of cone pulleys mounted spaced apart with their longitudinal or rotational axes substantially parallel and with the pulleys in approximate transverse alinement with their reduced end portions extending in opposite directions along the longitudinal axes, respectively, so that the reduced end portion of each pulley is opposite the enlarged end portion of the opposite pulley, respectively. The pulleys so mounted and arranged are operatively connected by a belt, or the like operating connection, extending therebetween and therearound, one of the pulleys being the driving pulley and the other pulley, through the medium of the belt, being the driven pulley. The belt is adapted to be shifted longitudinally along and across the pulleys by any suitable belt shifting means, in order to vary the ratio between the portions of the driving pulley and driven pulley over which the belt is mounted and to thereby change the speed of the driven pulley.

The foregoing general arrangement of change speed cone pulleys exemplifying this type of change speed gearing, is usually carried out by the use of smooth surfaced cone pulleys and a comparatively broad driving belt, in order to permit the belt being readily shifted longitudinally of the pulleys by sliding the same thereover and thereacross to different positions thereon without materially affecting the tension of the belt or decreasing the required traction thereof, all of which is well known and understood by those familiar with this art. However, under certain operating requirements and installment conditions it is desirable to obtain a greater and more clearly defined range of operating speeds for such types of change speed gearing, than is possible with the use of a wide flat belt on smooth pulleys; and therefore it is one of the main objects of the present invention to provide change speed pulleys for this type of change speed gearing, having a series of comparatively narrow circumferential grooves therearound for use with a narrow belt of the round or similar type, so that a greater range of speed changes is possible for a given length of pulley, and which grooved pulleys are so formed and constructed that a belt of the narrow round type can be readily and efficiently shifted across such pulleys from groove to groove therein without varying the tension of the belt or affecting the traction effect thereof.

A further object of the invention is to provide change speed cone pulleys of the type having a series of circumferential driving grooves therearound for receiving a narrow type belt, with a series of switch grooves so formed that a belt can be shifted from driving groove to driving groove in either direction longitudinally of a pulley and irrespective of the direction of rotation of the pulley.

A further object of the invention is to provide a change speed cone pulley of the type having a series of circumferential driving grooves therearound for receiving a belt of the narrow type, in which pulleys the walls between the grooves are so formed as to permit shifting of the belt from groove to groove with a minimum of resistance from the groove dividing walls.

A further object of the invention is to provide improved belt shifting means for change speed gearing of the belt type generally, which belt shifting means is particularly efficient in providing a method for shifting a belt of the narrow type in operation on and in connection with change speed cone pulleys of the instant invention.

With the foregoing and various other objects in view, which will be readily recognized and appreciated by those familiar with this art, the invention consists in certain novel features in constructions, combinations and arrangements as more fully and particularly set forth and specified hereinafter.

Referring to the accompanying drawings:

Fig. 1 is a view in elevation of a pair of cone pulleys embodying the present invention, operatively connected with a driving belt and showing a portion of the belt shifting means of the invention.

Fig. 2 is a side elevation of the belt shifting means of the invention, a belt being shown in transverse section in operative relation with respect thereto.

In Fig. 1 of the accompanying drawings a pair of cone pulleys 10 and 20 embodying the features of the present invention, are more or less diagrammatically illustrated in operative relation and connected by a suitable driving connection such as a belt 30 of the relatively small diameter round type. The pulleys 10 and 20 are shown as mounted on and carried by substantially parallel shafts 11 and 21, spaced apart and with the pulleys 10 and 20 having their reduced ends extending in opposite directions on the shafts 11 and 21, respectively, following the usual manner of mounting cone pulleys familiar to those skilled in the art. In the present instance the pulley 20 of the pair of pulleys, is the driving pulley, while the pulley 10 is the driven pulley, through the medium of the belt 30 extending around and between the pair of pulleys 10 and 20. The cone pulleys 10 and 20 embodying the invention are similar and each is of the grooved type provided with a series of adjacent circumferential grooves 22 therearound and separated by a series of dividing walls 23, respectively, as clearly shown in Fig. 1 of the drawings. The grooves 22 are formed around each pulley from end to end thereof and are, in the present instance, of a form substantially semicircular in cross section to receive a round belt such as the belt 30. Each pulley is provided with switch grooves extending between and placing the series of circumferential driving grooves 22 in intercommunication.

In the form of my invention illustrated, belt shifting paths are formed around each pulley in opposite directions, one of which paths includes the series of inclined or spirally disposed switch grooves 24 and portions of the driving or belt grooves 22, and the other of which includes the series of inclined or spirally disposed switch grooves 25 and portions of the belt grooves 22. These oppositely extending belt shifting paths including the series of oppositely inclined or spirally disposed switch grooves 24 and 25, respectively, start and terminate from substantially the same points in the outer driving or belt grooves 22 at the reduced and enlarged ends of each pulley, and the switch grooves 24 and 25 intersect each other at points along the length of the pulleys, preferably in the series of circumferential driving grooves 22.

Thus, from the foregoing, in connection with the accompanying drawings, it is seen that each driving groove 22 is connected and placed in communication with the adjacent grooves 22 of the series of circumferential driving grooves, by the spiral switch grooves 24 and 25 which extend thereacross at oppositely disposed angles and intersect at a point within the periphery or circumference thereof. The switch grooves 24 and 25 extend at an angle transversely across and cut through the dividing walls 23 between the driving grooves 22 to substantially the same depth as the bottoms of the grooves respectively adjacent and on opposite sides of each dividing wall 23 into which the grooves 24 and 25 open. In this manner the bottoms and sides of the switch grooves 24 and 25 merge into and join the bottoms and sides of the circumferential driving grooves 22 at the points in such grooves which they traverse.

The dividing walls 23 between the series of circumferential driving grooves 22 are beveled or inclined on opposite sides, respectively, outwardly and inwardly toward each other so that the outer peripheral edge of each wall 23 is of no appreciable thickness. Preferably, as indicated in the accompanying drawings the sides of the walls 23 facing toward the enlarged or base end of the pulley are inclined inwardly toward the reduced end of the pulley at a greater angle than the opposite sides, respectively.

The pulleys 10 and 20, so constructed and mounted in the relative positions on the shafts 11 and 21, respectively, as illustrated in Fig. 1 of the drawings are operatively connected by a round belt 30 of the proper diameter to fit within and be received by the circumferential driving grooves 22. The belt 30 extends between and over and around the pulleys 10 and 20 in the form of an endless driving connection, and fits within and extends around opposite alined grooves 22 on the pulleys. The pulley 20 is, in the present instance, the driving pulley and through the belt 30 drives the opposite pulley 10. It will be readily apparent that the ratio between the driving pulley 20 and the driven pulley 10 is variable by shifting the belt 30 longitudinally of the pulleys, so that the rate of speed at which the driven pulley is rotated is increased by shifting the belt 30 toward the large end of the driving pulley and reduced end of the driven pulley, and the rate of speed is decreased by shifting the belt toward the reduced end of the driving pulley and enlarged end of the driven pulley, due to the relative position of the pulleys with their reduced ends extending in opposite directions on the shafts 11 and 21. It will be further clear that the tension of the belt remains substantially the same in all positions longitudinally of the pulleys, as the change in diameter of the position on one pulley is compensated for by a corresponding opposite change in diameter on the other pulley.

The instant invention provides belt shifting means more or less diagrammatically illustrated in Fig. 2 of the accompanying drawings. A suitable base lever 40 is provided with a vertically disposed arm 41 extending upwardly to the lower ply of the belt 30 and formed with a depending finger 42 spaced from the arm 41. A second vertically disposed arm 43 extends upwardly from the base lever 40, spaced from the arm 41 and terminating a distance thereabove in a depending finger 44 spaced from the arm 43 and adapted to engage the upper opposite ply of the belt 30. The arms 41 and 42 are so arranged that in operative position the lower ply of the belt 30 is confined and extends between the arm 41 and depending finger 42, while the upper ply of the belt 30 is confined and extends between the arm 43 and the depending finger 44. The arm 41 is so positioned with respect to the arm 42 that, when the lower ply of the belt 30 is bearing against the arm 41, the upper ply of the belt is bearing against the arm 43 which is positioned above and substantially in line with the depending finger 42 of the arm 41, while when the lower ply of the belt 30 is bearing against the finger 42 of arm 41, due to movement of the base lever 40 transversely of the belt, the upper ply bears against the depending finger 44 which is positioned above and substantially in line with the arm 41. Thus, movement of the belt shifting means transversely of the belt in one direction results in pressure on one ply of the belt and release of the opposite ply thereof, and vice versa. The belt shifting means is mounted in operative position with respect to the belt 30 between the pulleys 10 and 20 with the base lever mounted for movement transversely of the belt by any suitable or desired actuating mechanism (not shown).

In operation of the pulleys 10 and 20 of the invention as change speed gearing the belt 30 is shifted through the action of the belt shifting means and the spiral switch grooves 24 and 25 between the driving grooves 22 on the pulleys. The belt is preferably always shifted toward the reduced end of a pulley and by pressure exerted on the ply of the belt moving in a direction onto a pulley. In Fig. 1 of the drawings the direction of rotation of the pulleys and direction of movement of the upper and lower plies of the belt onto and from the pulleys are indicated by the arrows. With the illustrated arrangement and operation of the pulleys 10 and 20, if it is desired to increase the rate of speed of the driven pulley 10 the belt 30 is shifted longitudinally of the pulleys toward the reduced end of the pulley 10 by the belt shifting means. As the lower ply of the belt 30 is moving onto the pulley 10 and it is desired to shift the belt toward the reduced end of pulley 10, the base lever 40 is moved transversely of the belt toward the reduced end of pulley 10, until the lower ply of the belt is engaged by arm 41 (see position of belt in Fig. 2), the upper ply of the belt being released from pressure, when continued force on the lower ply will force the belt 30 against the wall 23 of the groove in which the belt is located until the switch groove 24 which traverses such groove 22 and extends into the adjacent driving groove 22, receives the belt and guides and carries the same into such adjacent groove. The portion of the belt on pulley 20 follows the movement on pulley 10 and is caught and guided by the switch groove traversing the driving groove, into the next adjacent groove. If the movement of the belt shifting means and resulting pressure on the lower ply is continued the belt will be received and guided by the switch grooves from driving groove to driving groove into the outer groove 22 at the reduced end of pulley 10. In shifting the belt in the reverse direction from the above to reduce the speed of the driven pulley by moving the belt onto the enlarged portion of the driven pulley, the action and operation is the same, except that pressure is exerted on the upper ply of the belt, which is shifted on the pulley 20 toward the reduced end thereof, the belt following through the spiral grooves on pulley 10. In this manner the belt 30 can be shifted in either direction longitudinally of the pulleys and from groove to groove of the series of circumferential groves 22 by pressure applied transversely of the belt in the direction in which it is desired to move the same, the pressure being applied to shift that ply of the belt passing or moving onto a pulley. Due to the contsruction and arrangement of the spiral switch grooves 24 and 25, the belt 30 is shifted from groove to groove, in either direction along the pulleys, without varying the tension of the belt and without effecting the traction effect thereof on the pulleys. The beveling of the dividing walls 23 between the series of grooves 22, in the manner hereinbefore described, practically eliminates any objectional binding or transverse pull on the belt in shifting from driving groove to driving groove, as the pressure or force is applied to the belt to shift the same toward the reduced end of a pulley.

It is evident that various changes, variations, substitutions and modifications might be resorted to without departing from the spirit and scope of the invention and hence I do not wish to limit the invention to the exact disclosures hereof.

Desiring to protect my invention in the broadest manner legally possible, what I claim is:

1. A change speed cone pulley having a series of circumferential driving grooves therearound, and spiral switch grooves traversing and in communication with said driving grooves.

2. A change speed cone pulley having a series of circumferential driving grooves therearound, and a series of spirally disposed switch grooves traversing said driving grooves for shifting a belt in one direction along the pulley, and another series of spirally disposed switch grooves traversing said driving grooves for shifting a belt in the opposite direction.

3. In a change speed pulley having a series of circumferential belt grooves therearound, a series of switch grooves connecting and placing each belt groove in communication with the belt grooves respectively adjacent thereto.

4. In a change speed pulley having a series of circumferential belt grooves therearound, and dividing walls between said series of belt grooves, respectively, a switch groove extending through each dividing wall at an angle to the periphery thereof and opening into the belt grooves on opposite sides of each dividing wall, respectively.

5. In a change speed pulley having a series of circumferential belt grooves therearound, and a series of dividing walls between and separating said series of belt grooves, respectively, a switch groove extending transversely through each dividing wall and and opening into the belt grooves respectively, adjacent thereto, the bottom of each switch groove at the ends thereof in substantially the same plane as the bottom of the belt grooves into which they open, respectively.

6. In a change speed cone pulley having a series of circumferential belt grooves therearound and a series of dividing walls separating said series of belt grooves, respectively, the said dividing walls having the sides thereof facing the enlarged end of said pulley beveled outwardly toward the reduced end of the said pulley.

7. In change speed gearing a pair of cone pulleys mounted spaced apart with their rotational axes substantially parallel and the reduced ends of said pulleys extending in opposite directions along the axes, the said pulleys formed with a series of circumferential belt grooves therearound, each of said pulleys having series of spiral switch grooves connecting the belt grooves in opposite directions, and means mounted between the pulleys for shifting a belt longitudinally of the pulleys, in combination with a belt extending over, around and between said pulleys, said belt adapted to be shifted from groove to groove of said series of belt grooves, through said spiral switch grooves by pressure applied transversely of the said belt by said belt shifting means.

Signed at Lockport, New York, this 14th day of July, 1922.

CHARLES L. GINTY.